Oct. 23, 1951 A. PREISMAN 2,572,053

RADIO RECEIVER

Original Filed May 7, 1943

INVENTOR.
ALBERT PREISMAN

BY Percy P. Lantzy

ATTORNEY

Patented Oct. 23, 1951 2,572,053

UNITED STATES PATENT OFFICE 2,572,053

RADIO RECEIVER

Albert Preisman, Silver Spring, Md., assignor to Federal Telephone and Radio Corporation, New York, N. Y., a corporation of Delaware Original application May 7, 1943, Serial No. 485,971. Divided and this application August 6, 1945, Serial No. 609,217

5 Claims. (Cl. 250—20)

The present invention relates to radio reception, and more particularly to apparatus for controlling the reception of signals and picturing them on the screen of an oscilloscope.

This is a division of my copending application for "Scanning Control Means," Serial No. 485,971, filed May 7, 1943, now abandoned.

It is often advantageous, in a radio receiving system including an oscilloscope, to scan a portion of the spectrum and to locate accurately any frequency in that range. It is therefore desirable to provide an automatic control for the receiving circuit that will provide intervals of scanning separate from intervals of fixed tuning, so that the signals received during these intervals may then be separately pictured on the screen of the oscilloscope.

The present invention features an improved apparatus for accomplishing the above results, and is a further development of the idea disclosed in my copending application, Serial No. 485,970, filed May 7, 1943, now U. S. Patent No. 2,450,018 issued September 28, 1948, for "Radio Monitoring System."

Another object of the present invention is to control the deflection of an oscilloscope beam so as to separate the picture of the scanned signals appearing on the screen from the picture of the tuned signals.

The invention has as a still further object the provision of mechanical means for varying the inductance of a tuning coil forming a part of a receiving circuit, this means including a shield of conducting material which is periodically inserted between two windings of the coil to cause the receiver incorporating the coil to receive varying frequencies during periods when an irregularly-shaped portion of the shield is passing between the windings to vary the inductance of the coil, and to receive a single frequency during periods when a regularly-shaped portion of the shield (or no portion of the shield) is passing between the windings to hold the inductance of the coil constant.

Other objects and advantages will be apparent from the following description of a preferred embodiment of the invention and also from the accompanying drawings, in which.

Figure 1:
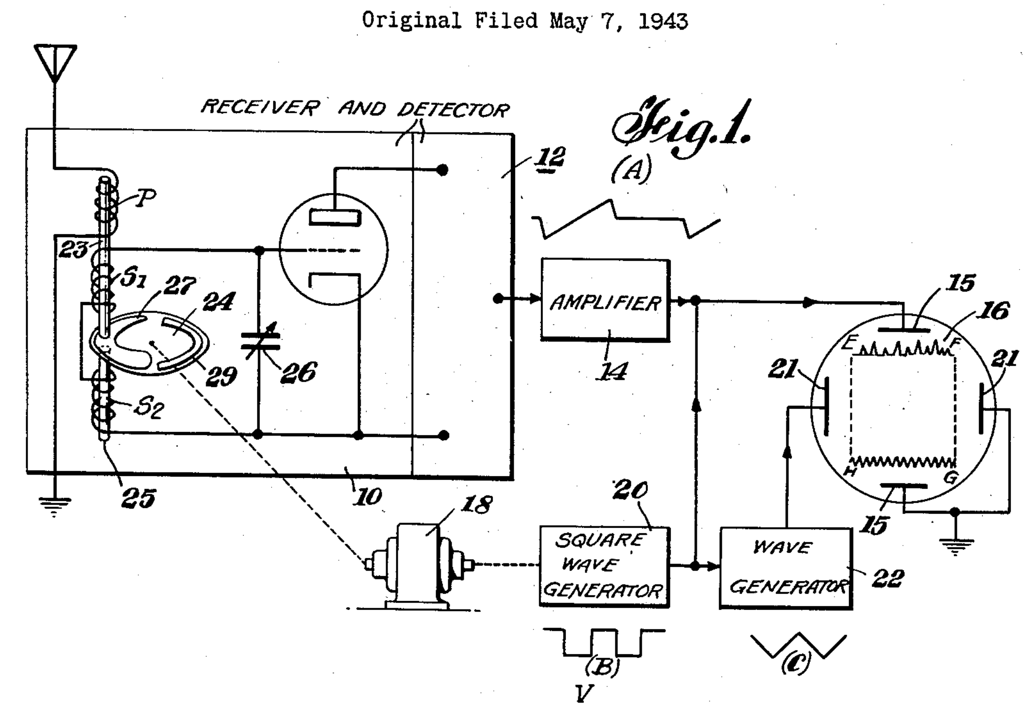
Fig. 1 is a schematic and block diagram of a radio receiving circuit in accordance with the present invention.

In Fig. 1 is shown a receiver and detector 12, which includes a first tuning circuit portion 10. The output of receiver and detector 12 is applied through an amplifier 14 to the vertical deflection plates 15 of an oscilloscope having a screen 16. A square wave generator 20 is also shown, operated by a motor 18. A portion of the square wave output of generator 20 is fed to the vertical deflection plates 15 of the oscilloscope, and the remaining portion is applied to the horizontal deflection plates 21 of the oscilloscope through a wave generator 22.

In the tuning circuit portion 10 of Fig. 1 is illustrated a pair of coil forms 23 and 25 lying along the same longitudinal axis. On coil form 23 is wound a primary winding P and a portion of a secondary winding $S_1$. On coil form 25 is wound another secondary winding portion $S_2$. $S_1$ and $S_2$ are connected in series as shown.

An insulating disc 24 is rotatably mounted between coil forms 23 and 25. This disc is designed to be rotated by motor 18 synchronously with the operation of square wave generator 20. The rotation of disc 24 may either be clockwise or counterclockwise as may be desired depending upon whether a decreasing or an increasing frequency scanning is preferred.

In a preferred arrangement, the face of disc 24 has positioned thereon two strips 27 and 29 (Fig. 2) of conducting material, such as copper sheet. These strips 27 and 29 are designed to pass alternately between coil forms 23 and 25 upon rotation of disc 24 by motor 18 to act as partial shields between windings $S_1$ and $S_2$, thus reducing the mutual inductance between these windings and hence the total inductance of the overall secondary.

Figure 2:
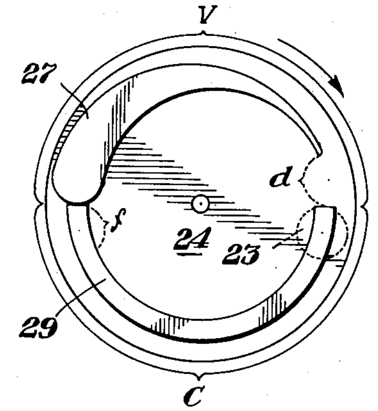
Fig. 2 is a side view of the inductance-varying device indicated in Fig. 1.

As will be seen from Fig. 2, insulating disc 24 is divided into two sections $v$, $c$ of approximately 180° each. Section $v$ includes strip 27, which is irregular in cross-section so as to present between windings $S_1$ and $S_2$ upon rotation of disc 24 an area of conducting material constantly varying from a minimum to a maximum value (for the clockwise direction of rotation assumed). This results in a variation in the inductance of $S_1$ and $S_2$ from a maximum to a minimum value.

On the other hand section $c$ includes strip 29, which is regular in cross section so as to present between windings $S_1$ and $S_2$ upon rotation of disc 24 a constant area of conducting material, thus holding the inductance of $S_1$ and $S_2$ substantially fixed. If strip 29 has half the cross section of strip 27 at its widest end, the inductance of $S_1$, $S_2$ will be fixed during half-revolution c at a value intermediate between the minimum and maximum values of inductance produced by strip 27 during half-revolution $v$.

Thus the receiver-detector 10, 12 of Fig. 1 can be made to scan, or receive varying frequencies, during half-revolution $v$ of disc 24, and be made to tune or receive a single frequency, during half-revolution $c$. A variable condenser 26 is connected in parallel with $S_1$, $S_2$ to preselect the scanning range desired.

Figure 3:
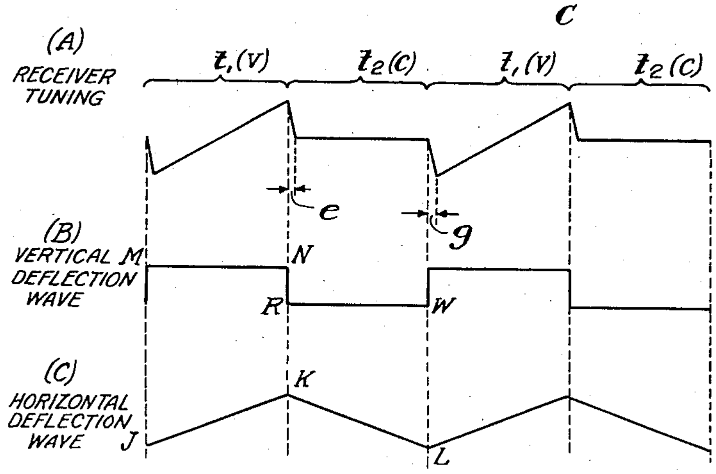
Fig. 3 is a set of curves illustrating the operation of the circuit of Fig. 1.

The above operation results in an alternate scanning tuning output of the receiver-detector 10, 12. The variation in frequency with time for the design of the strips chosen by way of example is illustrated in Fig. 3 (A), $t_1$ representing the time consumed during half-revolution $v$ of disc 24, and $t_2$ representing the time consumed during half-revolution $c$.

At the beginning of half-revolution $v$ (if the disc 24 is positioned relative to coil form 23 as shown in Fig. 2), the coils are still shielded by a portion of strip 29. Upon rotation of the disc, the insulated section $d$ enters the gap between $S_1$ and $S_2$, this section having a length approximately equal to the diameter of the coil forms 23 and 25. The mutual inductance between the coils will thus increase until the coil form 23 is completely intercepted by the insulating section $d$, at which time the mutual inductance of $S_1$, $S_2$ will have a maximum value. As the smaller end of strip 27 now enters the gap between $S_1$ and $S_2$, the inductance decreases steadily until completion of half-revolution $v$. As half-revolution $c$ begins, the inductance increases until the coils are separated solely by constant area strip 29, at which point the increase terminates, and the inductance remains fixed during the remainder of half-revolution $c$ back to the original starting point. It will thus be seen that half-revolution $v$ does not result in a constantly decreasing mutual inductance between the coils during the entire period $t_1$, but that an intermediate or change-over, period $g$ is present during which an increase in inductance occurs. Similarly, half-revolution $c$ does not result in a constant inductance during the entire period $t_2$, but a change-over period $e$ is present during which the inductance varies. Time interval $e$ corresponds to $f$ of Fig. 2; time interval $g$ to $d$ of Fig. 2. These change-over periods produce undesirable variations in the traces on the screen of the oscilloscope, and are eliminated in one of the conventional manners hereinafter mentioned. In graph A of Fig. 3, the variations in frequency received is assumed to be inversely proportional to the variation in mutual inductance of $S_1$, $S_2$.

In order to picture the result of the above described scanning-tuning signal reception on the screen 16 of the oscilloscope, the following procedure may be followed. A square wave generator 20 is operated by motor 18 as shown in Fig. 1, the wave output of this generator being shown in Fig. 3 (B). The period of this square wave B is the same as the period of tuning variation A, that is, $(t_1+t_2)$. In other words, one rotation of disc 24 equals in time one cycle of square wave B, due to their common control means 18. A possible method of generating square wave B would utilize a rotating switch mounted on the driving shaft of motor 18, and have a brush connected to a suitable D. C. supply, such as the plate circuit of the receiver and detector 10, 12.

Also produced in the circuit of Fig. 1 is a triangular wave C, this wave being integrated or keyed in a well-known manner from square wave B by the wave generator 22, as shown. The periods of waves B and C are similar, as shown in Fig. 3.

Wave B, upon which is superimposed the signal output of the receiver 10, 12 representing frequencies as shown in Fig. 3 (A) is applied to the vertical deflection plates of the oscilloscope. Wave C is applied to the horizontal deflection plates, suitable amplifying means (not shown) being employed if necessary.

The resulting picture on the screen 16 of the oscilloscope is shown in Fig. 1. Trace EF covers the varying frequencies received during the scanning half-revolution $v$ of disc 24, and appears on the upper half of screen 16 due to the high potential period MN of vertical deflection wave B. The portion JK of triangular wave C sweeps across the screen 16 this portion MN of wave B on which is superimposed the scanning output of the amplifier 14 during half-revolution $v$ of disc 24.

Trace GH is the reverse sweep due to portion KL of horizontal deflection wave C. During this time the equal-area conducting strip 29 is passing between $S_1$, $S_2$ and the receiver portion 10 is tuned to a single frequency. Also due to lower potential portion RW of vertical deflection wave B, trace GH is on the lower half of oscilloscope screen 16.

Thus trace GH should be a picture of the time wave shape of the signal which happens to be of the frequency to which the receiver is tuned during $t_2$.

Dotted lines FG, HE represent the instant downward and upward shifts, respectively, occurring at the ends of the half periods of wave B.

The undesirable portions of traces EF and GH occurring during intervals $e$ and $g$, wave A, as a result of the portions $d$ and $f$ of the disc construction may be eliminated from the visual area of screen 16 by one of several conventional methods. These include a suitable covering of the outer edges of screen 16 by opaque material so that only the desired parts of the pictures will be observed, a decrease in horizontal sweep voltage at the beginning of intervals $t_1$ and $t_2$ so that little, if any, sweep occurs during intervals $e$ and $g$, or, to control the grid in the oscilloscope to blank the beam during intervals $e$ and $g$.

Through manual adjustment of the condenser 26, any single frequency may be selected from the range pictured in EF as a result of the changing inductance of $S_1$, $S_2$, and transferred from the upper to the lower half of the oscilloscope screen 16 to permit close inspection of its characteristics.

While I have described above the principles of my invention in connection with specific apparatus, it is to be clearly understood that this description is made only by way of example and not as a limitation on the scope of my invention.

I claim:

1. In a radio circuit including a receiver and an oscilloscope having a screen, means for cyclically tuning said receiver to scan a given frequency band to derive the signals thereof during a part of a given cycle, means operative alternately with said first-mentioned means for maintaining said receiver receptive to signals of fixed frequency during another part of said cycle, means for applying said received scanned signals and said received fixed frequency signals to said oscilloscope to produce trace indications on the screen thereof, means for separating the traces corresponding to said received fixed frequency signals and said received scanned signals on the screen in synchronism with their respective occurrences during said cycle.

2. The radio circuit of claim 1, in which said first mentioned means comprises means for uniformly tuning said receiver in a given direction during substantially half of said cycle.

3. In a receiver circuit, an oscilloscope comprising separate deflection elements, a receiver, first means for sequentially and cyclically tuning said receiver to scan a given frequency band, means for tuning said receiver to be receptive to signals of a single frequency included in said frequency band, means for alternately rendering effective the said first and second means at a given rate, means for applying the received signals to one set of deflection elements, means for producing a square wave at said given rate, means for applying said square wave to said one set of deflection elements, means for producing a source of scanning waves at said rate, and means connecting said source to said other set of deflection elements.

4. In a circuit including a receiver on a cathode ray oscilloscope having a screen and deflection element, means cyclically scanning a given frequency band over a given period of the operating cycle of said receiver, means coupled to said receiver and said deflection element producing a trace across a portion of the face of said screen indicative of the signals being received during said scanning, means selectively receiving a given frequency during a separate period of the operating cycle of said receiver, and means coupled to said receiver and deflection element for producing a trace across another portion of the face of said screen indicative of the signal being received at said given frequency during said other period of the operating cycle.

5. In a circuit including a receiver on a cathode ray oscilloscope including a beam producing means, a screen and vertical and horizontal deflection elements, means cyclically scanning a given frequency band of a given period of the operating cycle of said receiver, means selectively receiving a given frequency in said band during a separate period of the operating cycle of said receiver, means applying a voltage to the horizontal deflection plate of said cathode ray tube to sweep the beam in one direction across the face of said screen during said given period of the operating cycle and to sweep the beam backward in the opposite direction across the face of said screen during said other period of said operating cycle, means applying said scanned received signals to said vertical deflection plate to produce a visual indication of the signals being received during said scanning period and during said other period, and means applying a voltage to said vertical deflection plate to displace the trace during said other period of said operating cycle to thereby produce a separate indication of the signal received over said given frequency.

ALBERT PREISMAN.

REFERENCES CITED

The following references are of record in the file of this patent:

UNITED STATES PATENTS

| Number | Name | Date |
|---|---|---|
| 2,347,977 | Van Lieshout | May 2, 1944 |
| 2,381,940 | Wallace et al. | Aug. 14, 1945 |
| 2,412,991 | Labin | Dec. 24, 1946 |